J. Strayer.
Seed Dropper.
No. 1,665. Reissued May 10, 1864.
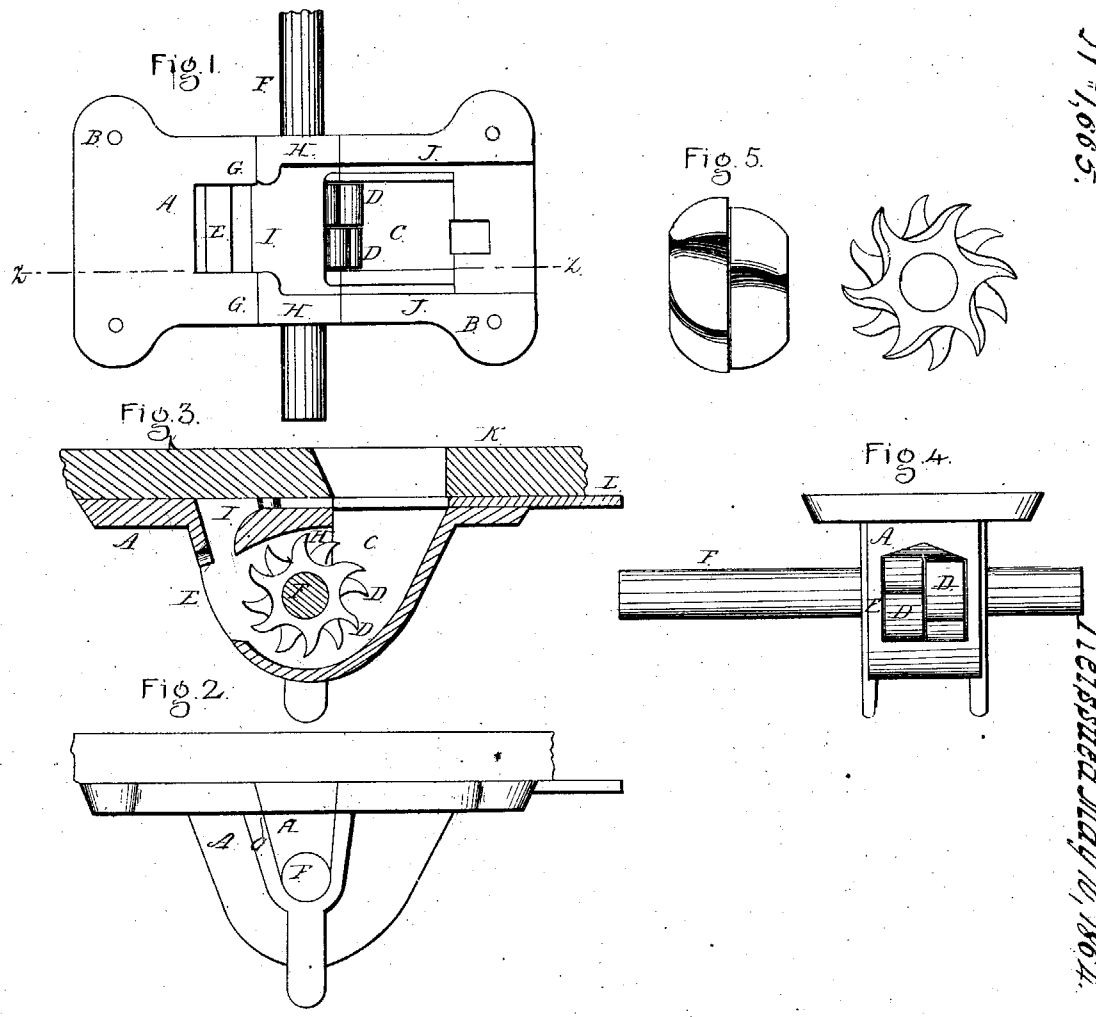
Witnesses:
R. M. Sherman
J. E. Dennis
Inventor:
Jacob Strayer
By his Attorney
J. Dennis Jr.
N. PETERS, PHOTO-LITHOGRAPHER, WASHINGTON, D. C.

UNITED STATES PATENT OFFICE.

JACOB STRAYER, OF SOUTH BEND, INDIANA.

IMPROVEMENT IN SEED-DRILLS.

Specification forming part of Letters Patent No. 32,319, dated May 14, 1861; Reissue No. 1,665, dated May 10, 1864.

*To all whom it may concern:*

Be it known that I, JACOB STRAYER, of South Bend, in the county of St. Joseph and State of Indiana, have invented a new and useful Improvement in Seed-Drills; and I do hereby declare that the following is a full and exact description thereof, reference being had to the accompanying drawings, and to the letters of reference marked thereon.

My invention consists in making a feed-roller with the feed cups or spaces on one part of the roller opposite the teeth on the other part or section of the roller, in order to produce a nearly-continuous or uniform feed, and to prevent the grain or seed from falling in bunches.

In the accompanying drawings, Figure 1 is a top view of the feed-roller and box containing the same. Fig. 2 is a side elevation of the same. Fig. 3 is a vertical section on the line *z z*, Fig. 1. Fig. 4 is an end view. Fig. 5 represents a spheroidal roller. Fig. 6 represents a straight roller.

In the accompanying drawings my feed devices are shown detached from the rest of the machine.

The box A is made of cast-iron, and fastened to the bottom K, Fig. 3, of the seed-box by screws inserted in holes B, Fig. 1, or any other suitable manner.

The shaft F of the feed-roller rests in the scores G G, which are closed by the caps H, Fig. 2, the two caps being connected by a bridge, I, Fig. 1. This feed-shaft F is properly geared to the traveling-wheel of the machine in the usual manner. As the machine travels forward the shaft F revolves, and the grain or seed, descending through the opening C, Figs. 1 and 2, is carried forward by the teeth D D, Fig. 3, and discharged at E, as indicated by the arrows, Fig. 3. The teeth D D, Fig. 3, do not extend the whole length of the roller. This is best seen in Fig. 4, where the roller is represented as cast in two sections and the teeth running half the length of the roller. The teeth on one section of the roller are placed opposite the depressions or feed-cups on the other section of the roller for the purpose of discharging or feeding the grain more uniformly and continuously, and not in charges or masses. This is practically a great advantage over the feeding-rollers heretofore used, which drop the grain or seed frequently in bunches.

My invention may be applied to feed-rollers made of the same size from end to end, as in Fig. 6, or spheroidal, as in Fig. 5, or of any other suitable form, according to the kind of grain to be planted. When the form of the roller is raised the shape of the roller-box A must be made to correspond therewith, so that the teeth D D will work properly.

The feed-roller is cast in two pieces or sections, D D, and these sections are placed upon the shaft F. This mode of casting renders it easy to mold the parts and give a good casting.

Having thus fully described my invention, what I claim, and desire to secure by Letters Patent of the United States, is—

Making the teeth on one part or portion of the feeding-roller for seed-drills opposite the spaces between the teeth on the other part or portion of said roller, substantially as described, so as to deliver or discharge the seed more uniformly.

JACOB STRAYER.

Witnesses:
A. S. DUNBAR,
W. SAUNDERS.